(12) United States Patent
Kasprzycki

(10) Patent No.: US 12,600,613 B2
(45) Date of Patent: Apr. 14, 2026

(54) BEATER BAR FOR FROZEN BEVERAGE DISPENSING MACHINE

(71) Applicant: Marmon Foodservice Technologies, Inc., Osseo, MN (US)

(72) Inventor: Tomasz Kasprzycki, Carpentersville, IL (US)

(73) Assignee: Marmon Foodservice Technologies, Inc., Osseo, MN (US)

( * ) Notice: Subject to any disclaimer, the term of this patent is extended or adjusted under 35 U.S.C. 154(b) by 220 days.

(21) Appl. No.: 18/448,462

(22) Filed: Aug. 11, 2023

(65) Prior Publication Data

US 2024/0076177 A1    Mar. 7, 2024

Related U.S. Application Data

(60) Provisional application No. 63/373,423, filed on Aug. 24, 2022.

(51) Int. Cl.
| | |
|---|---|
| *B67D 1/08* | (2006.01) |
| *A23G 9/22* | (2006.01) |
| *A23G 9/28* | (2006.01) |

(52) U.S. Cl.
CPC ........... B67D 1/0857 (2013.01); *A23G 9/224* (2013.01); *A23G 9/28* (2013.01)

(58) Field of Classification Search
CPC ........ B67D 1/0857; A23G 9/224; A23G 9/28; A23G 9/22; A23G 9/222; A23G 9/16
See application file for complete search history.

(56) References Cited

U.S. PATENT DOCUMENTS

| | | | |
|---|---|---|---|
| 2,526,367 A | 10/1950 | Kaltenbach et al. | |
| 3,460,713 A | 8/1969 | Cornelius | |
| 3,608,779 A | 9/1971 | Cornelius | |
| 3,848,289 A | 11/1974 | Bachmann | |
| 4,095,307 A | 6/1978 | Brubaker | |
| 5,103,649 A | 4/1992 | Kieffer | |
| 9,301,537 B2 | 4/2016 | Cocchi | |
| 9,335,082 B2 | 5/2016 | Gist et al. | |
| 9,528,740 B1 | 12/2016 | Gist et al. | |
| 10,138,107 B2 | 11/2018 | Zemko et al. | |
| 11,154,074 B2 | 10/2021 | Greenberg et al. | |
| 2004/0141411 A1 * | 7/2004 | Huang | B01F 35/32 |
| | | | 366/197 |
| 2008/0073376 A1 | 3/2008 | Gist et al. | |
| 2009/0211269 A1 | 8/2009 | Gist et al. | |
| 2009/0288429 A1 | 11/2009 | Elsom | |

FOREIGN PATENT DOCUMENTS

| | | | | | |
|---|---|---|---|---|---|
| EP | 100469 A2 * | 2/1984 | ............. | A23G 9/224 |
| EP | 580115 A1 * | 1/1994 | ............. | A23G 9/224 |
| FR | 1322075 A | 3/1963 | | |

OTHER PUBLICATIONS

Extended European Search Report for European Patent Application No. 23192353.3, dated Jan. 31, 2024.

* cited by examiner

*Primary Examiner* — Donnell A Long

(74) *Attorney, Agent, or Firm* — Andrus Intellectual Property Law, LLP

(57)    ABSTRACT

A beater bar for use within a beverage machine includes a shaft and a plurality of arms extending radially away from the shaft. An end cap of a plurality of end caps extends away from each arm of the plurality of arms. A scraper blade is secured to the plurality of arms by engagement with the plurality of end caps respectively secured to the plurality of arms.

20 Claims, 10 Drawing Sheets

BEATER BAR FOR FROZEN BEVERAGE DISPENSING MACHINE

CROSS-REFERENCE TO RELATED APPLICATIONS

The present application claims priority of U.S. Provisional Patent Application No. 63/373,423, filed on Aug. 24, 2022, the content of which is hereby incorporated by reference in its entirety.

FIELD

The present disclosure relates to frozen beverage dispensing machines. More specifically, the present disclosure relates to a beater bar for use in making a frozen beverage to dispense.

BACKGROUND

Frozen, including semi-frozen, food products are known to include a slush beverage from the partial freezing of a carbonated water and a syrup.

Frozen carbonated beverage (FCB) machines generally utilize a freezing cylinder for producing a slush beverage therein. An evaporator coil is wrapped around the exterior of the cylinder for cooling the cylinder and the contents therein. A scraper mechanism extends along the central axis of the cylinder and is rotated to scrape thin iced or frozen layers of the beverage or food product from the internal surface of the cylinder. A carbonator tank is used to produce carbonated water by the combination therein of water and pressurized carbon dioxide gas ($CO_2$).

Various examples of FCB machines are known and disclosed in for example: U.S. Pat. No. 3,460,713, entitled "Method of Dispensing a Refrigerated Beverage"; U.S. Pat. No. 3,608,779, entitled "Method and Apparatus for producing and dispensing a Semifrozen Carbonated Beverage"; U.S. Pat. No. 5,103,649, entitled "Frozen Carbonated Beverage Apparatus and Method and Control System Therefor"; U.S. Pat. No. 10,138,107, entitled "Frozen Beverage Dispensing Machines with Multi-Flavor Valves"; U.S. Pat. No. 11,154,074, entitled "Modular Refrigeration Sub systems for Frozen Carbonated Beverage Systems"; US Patent Application Publication No. 2008/0073376, entitled "Frozen Carbonated Modulating Dispensing Valve and/or Flavor Injection"; and US Patent Application Publication No. 2009/0211269, entitled "Adaptive Beater and Scraper Speed Control for Frozen Product Dispensers," each of which is incorporated by reference herein in its entirety.

U.S. Pat. No. 9,528,740, which is incorporated by reference herein in its entirety, discloses a controller for a drive motor for a scraper of a frozen product dispenser. The drive motor operates to rotate the scraper at selected ones of a plurality of different speeds within a freeze barrel of the dispenser.

U.S. Pat. No. 2,526,367 discloses an agitator for an apparatus comprising a shaft, a pair of outwardly extending arms on said shaft. Each shaft has at its free end a cylindrical bore parallel to said shaft provided with an open side section. The agitator further includes a scraper blade having a cylindrical formation pivotally mounted in each bore, and pin and groove means associated with one of said bores and one of said formations for locking said blade against axial movement with respect to said bores, said groove means being transverse.

U.S. Pat. No. 3,848,289 discloses a scraper blade which is made from polyphenylene sulfide (PPS) and uniformly filled with a reinforcing filler such as short glass fibers. The blade has a scraping edge of a substantially 90-degree angle.

U.S. Pat. No. 4,095,307 discloses a scraper for the interior surface of a vessel having an inner shaft positioned within the vessel. A plurality of arms are disposed radially with respect to the inner shaft in parallel pairs. Scraping means for scraping the interior surface of the vessel mount to the plurality of peripheral shafts. The scraping means includes a lever having two pivotal arms, one pivotal arm encompassing a blade and the other pivotal arm having a spring means for urging contact between the blade and the inner surface of the vessel. The inner shaft may be constructed with sufficient flexibility to generally coincide with the deflected axis of imperfect vessels.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

A beater bar may be used with a beverage machine. Examples of a beater bar configured for use within a beverage machine include a shaft and a plurality of arms extending radially away from the shaft. An end cap of a plurality of end caps extends away from each arm of the plurality of arms. A scraper blade is secured to the plurality of arms by engagement with the plurality of end caps respectively secured to the plurality of arms.

In further examples of the beater bar each end cap includes an arm cap and the arm cap is configured to connect to an arm of the plurality of arms. Each arm of the plurality of arms includes a keyed projection. The arm cap includes a keyhole that is configured to receive the keyed projection of an arm of the plurality of arms. Each end cap includes a beam that extends away from the arm cap and connects the arm cap to a scraper cap configured to secure to the scraper blade. In each end cap, the beam joins the arm cap at an elbow and the scraper cap is configured to deflect towards an arm of the plurality of arms about the elbow. Each end cap is cantilevered from the arm to which the end cap is connected. The arm cap and the arm are co-axial and the beam extends at an acute angle relative to the arm cap and the arm. Each of the scraper caps may include a projection configured to engage the scraper blade. At least one projection of the scraper caps is keyed to define an orientation of the scraper blade relative to the plurality of arms. The arm cap includes a keyhole that is configured to receive a keyed projection of an arm of the plurality of arms. The keyhole of the arm cap corresponds to the orientation of the scraper blade defined by the projection of the scraper cap.

In further examples of the beater bar, the shaft and the arms are constructed of metal and the end caps are constructed of a polymer. The plurality of arms may be a first plurality of arms and the scraper blade is a first scraper blade. The beater bar may further include a second plurality of arms extending radially away from the shaft in a direction opposite the first plurality of arms. A second scraper blade may be secured to the second plurality of arms by end caps secured between each arm of the second plurality of arms and the second scraper blade. The end caps may include an arm cap configured to connect the end cap of an arm of the plurality of arms. A scraper cap may be configured to connect the end cap respectively to the first scraper blade or the second scraper blade. A beam may extend at an acute angle from the arm cap to the scraper cap. The scraper caps may be connected to the first scraper blade radially opposite from scraper caps connected to the second scraper blade.

Examples of a beverage dispensing system include a barrel configured to be cooled. A beater bar includes a shaft and a plurality of arms extending radially away from the shaft. A plurality of end caps, with an end cap of the plurality of end caps extending away from each arm of the plurality of arms. A scraper blade is secured to the plurality of arms by engagement with the end caps secured to each arm of the plurality of arms. A motor is coupled to the beater bar and configured to rotate the beater bar within the barrel.

In further examples of the beverage dispensing system, each end cap further includes an arm cap, a scraper cap and a beam. The arm cap is configured to connect the end cap to an arm of the plurality of arms. The scraper cap is configured to connect the end cap to the scraper blade. The beam extends at an acute angle from the arm cap to the scraper cap. Each arm of the plurality of arms includes a keyed projection and each arm cap includes a keyhole that is configured to receive the keyed projection of an arm of the plurality of arms. The plurality of arms may be a first plurality of arms, the plurality of end caps are first end caps and the scraper blade may be a first scraper blade where the beater bar further includes a second plurality of arms and a second scraper blade. The second plurality of arms extend radially away from the shaft in a direction opposite the first plurality of arms. The second scraper blade is secured to the second plurality of arms by second end caps secured between each arm of the second plurality of arms and the second scraper blade. Each second end cap may include a second arm cap, a second scraper cap, and a second beam. The second arm caps are configured to connect the second end caps to an arm of the second plurality of arms. The second scraper caps are configured to connect the second end cap to the second scraper blade. The second beam extends at an acute angle from the second arm cap to the second scraper cap. The motor may be configured to rotate the beater bar within the barrel in a first direction and when the beater bar rotates within the barrel in the first direction, the scraper blade trails the plurality of arms.

Various other features, objects, and advantages will be made apparent from the following description taken together with the drawings.

BRIEF DESCRIPTION OF THE DRAWINGS

The present disclosure is described with reference to the following Figures. The same numbers are used throughout the Figures to reference like features and like components.

DETAILED DESCRIPTION

In the present description, certain terms have been used for brevity, clarity and understanding. No unnecessary limitations are to be inferred therefrom beyond the requirement of the prior art because such terms are used for descriptive purposes only and are intended to be broadly construed. The different apparatuses, systems, and methods described herein may be used alone or in combination with other apparatuses, systems, and methods. Various equivalents, alternatives and modifications are possible within the scope of the appended claims.

Figure 1:
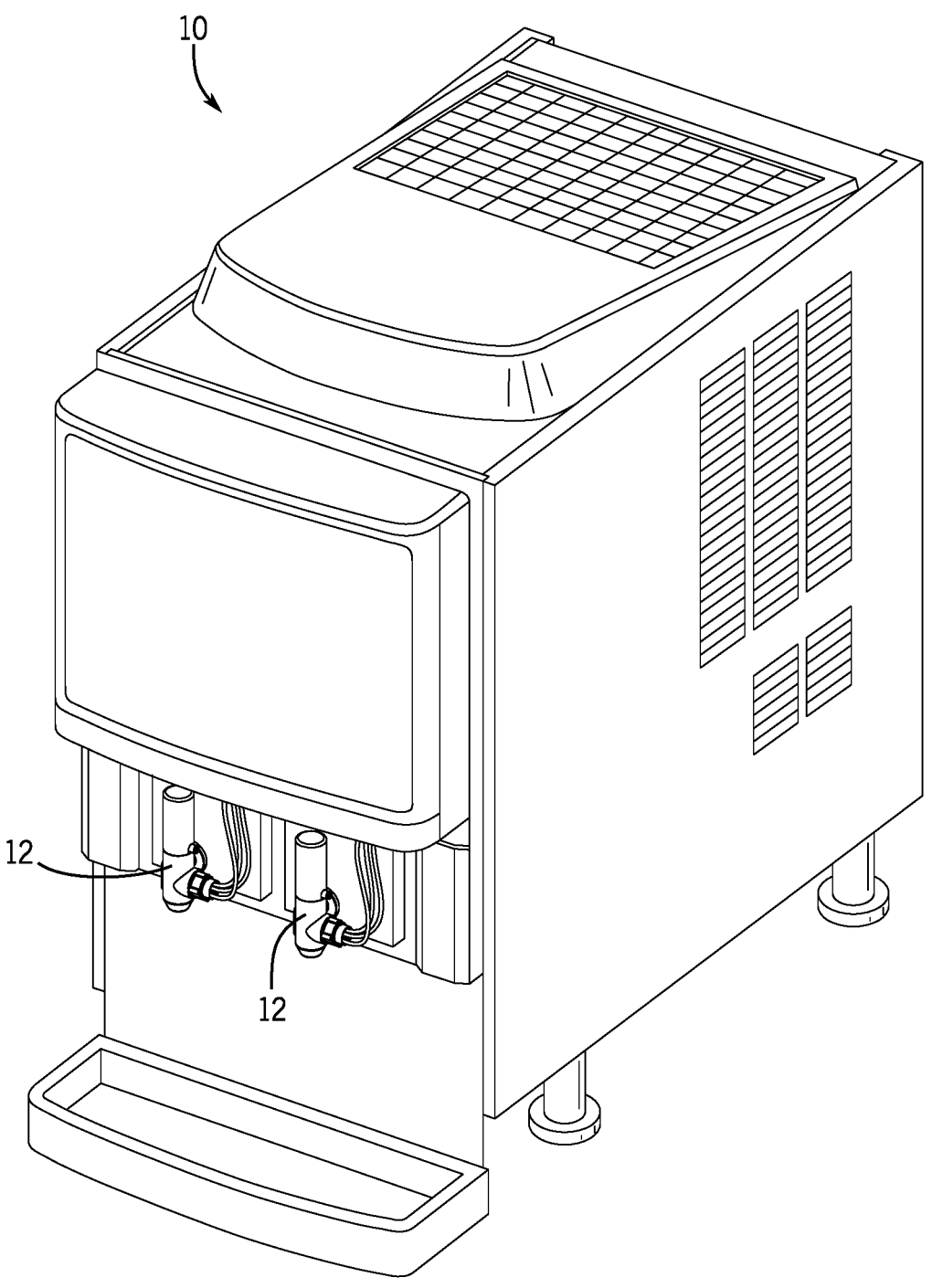
FIG. 1 is a perspective view of an example beverage machine with two valves.

FIG. 1 is an example beverage dispensing machine 10 that dispenses a frozen beverage, and in an example, a semi-frozen carbonated beverage, to an operator. U.S. Pat. No. 10,138,107, entitled "Frozen Beverage Dispensing Machines with Multi-Flavored Valves," and U.S. Pat. No. 11,154,074, entitled "Modular Refrigeration Sub systems for Frozen Carbonated Beverage Systems," which are incorporated by reference herein in their entireties provide examples of frozen beverage dispensing machines which may incorporate the features as disclosed herein. The beverage machine 10 includes at least one valve 12 that receives a base fluid (e.g. a liquid/frozen slush fluid, a carbonated liquid/frozen slush fluid) and optionally an additive fluid (e.g. cherry flavoring syrup, vanilla flavoring syrup) and dispenses a beverage (e.g. a vanilla cherry flavored carbonated liquid/frozen slush mixed beverage) that includes the base fluid and the additive fluid. In other examples, the beverage dispensing machine 10 separately flavoring and/or coloring and/or other additives to the semi-frozen beverage at or about the valve 12. The number of valves 12 included with the beverage machine 10 can vary.

Figure 2:
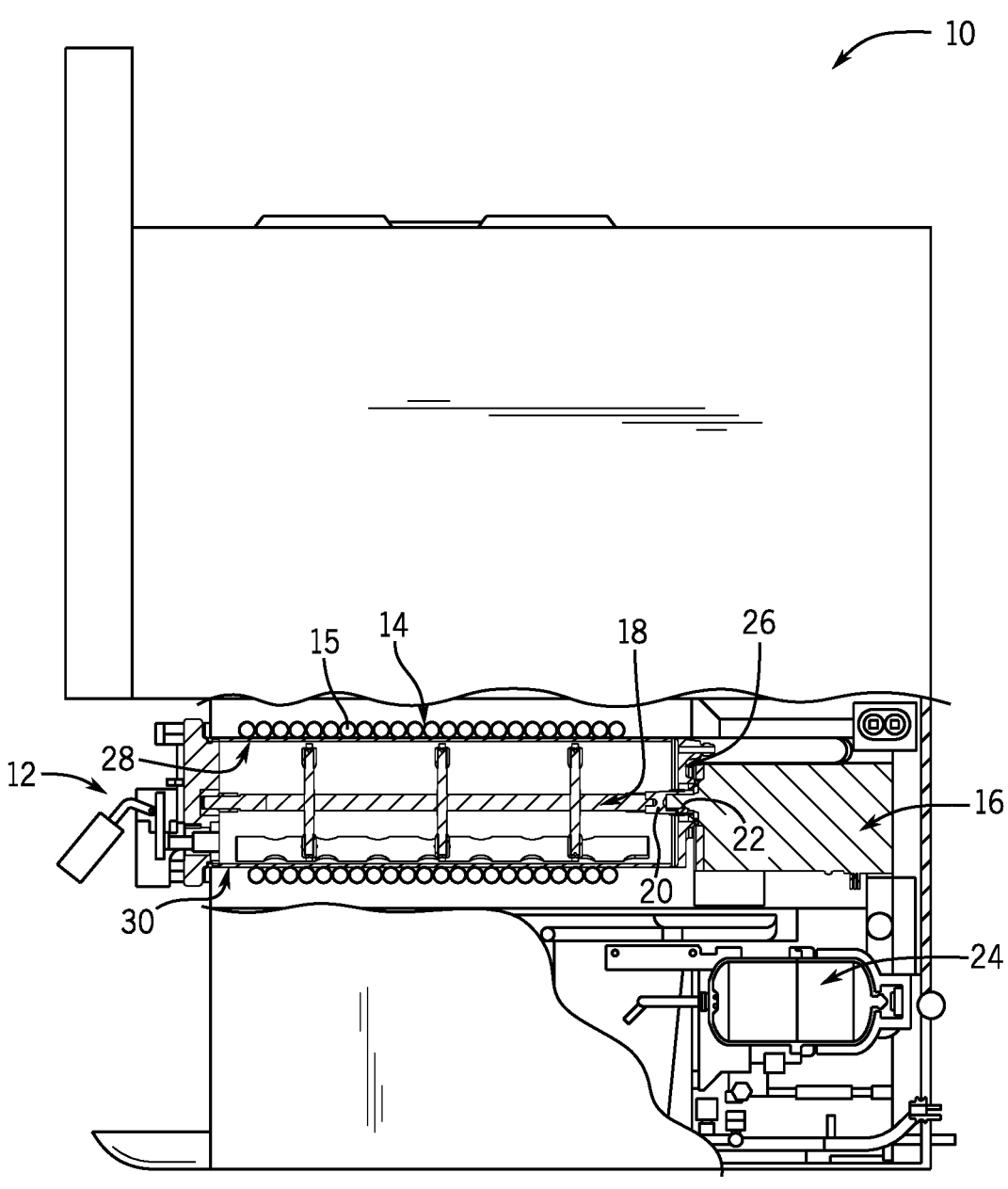
FIG. 2 is a sectional view of an example of a beverage dispensing machine.

FIG. 2 is a sectional view of an example of a beverage dispensing machine 10. The frozen carbonated beverage is prepared and stored within a barrel 14 until the beverage is dispensed from the barrel 14 via the valve 12. The barrel 14 is surrounded by heat transfer coils 15. The beverage dispensing machine 10 operates to cool or heat the barrel 14 using the heat transfer coils 15. A motor 16 is coupled to a beater bar 18 by a coupling shaft 20 that passes through a rotary barrel seal 22. An expansion tank 24 is provided between a water supply and a barrel inlet 26 defined within the barrel 14. The beater bar 18 includes scraper blades 28 attached thereto, best shown in FIG. 10. In examples, the beater bar 18 is rotated at a fixed speed by the motor 16. The barrel 14 is chilled to below freezing by the heat transfer coils 15 connected to a refrigeration system and beverage (carbonated or still) inside the barrel freezes on contact with an interior surface 30 of the barrel 14. The scraper blades 28 run across the interior surface 30 of the barrel 14, scraping the frozen beverage from the interior surface 30 and accumulating the removed frozen beverage in the interior of the barrel 14 about the beater bar 18. A control system (not depicted) monitors the power required for the motor 16 to rotate the beater bar 18 and the scraper blades 28 through the accumulated semi-frozen beverage. The monitored power consumption is then used to estimate the viscosity of the product within the barrel 14.

The inventor has observed that upon installation, over time, or due to wear, the beater bar of the dispenser may become misaligned within the barrel 14. The scraper blades of the beater bar are foils and the accumulated semi-frozen beverage within the barrel presses the scraper blades against the interior surface of the barrel, this imparts an oscillatory component that is transferred through the beater bar, amplifying the vibrations. This movement of the beater bar and the scraper blades can over time damage the weld seal within the barrel. Variation in the interior surface 30 either from construction or use of the barrel 14 places radially inward impact forces upon the scraper blades. These forces are transferred along a radius of the arms through the beater bar and result in further impacts between the opposite scraper blade and the barrel. Furthermore, under certain circumstances, ice formation inside the barrel provides force shocks on the beater bar as the scraper blade impacts these ice formations. A beater bar construction with improved performance with reduced wear is therefore disclosed.

Figure 3:
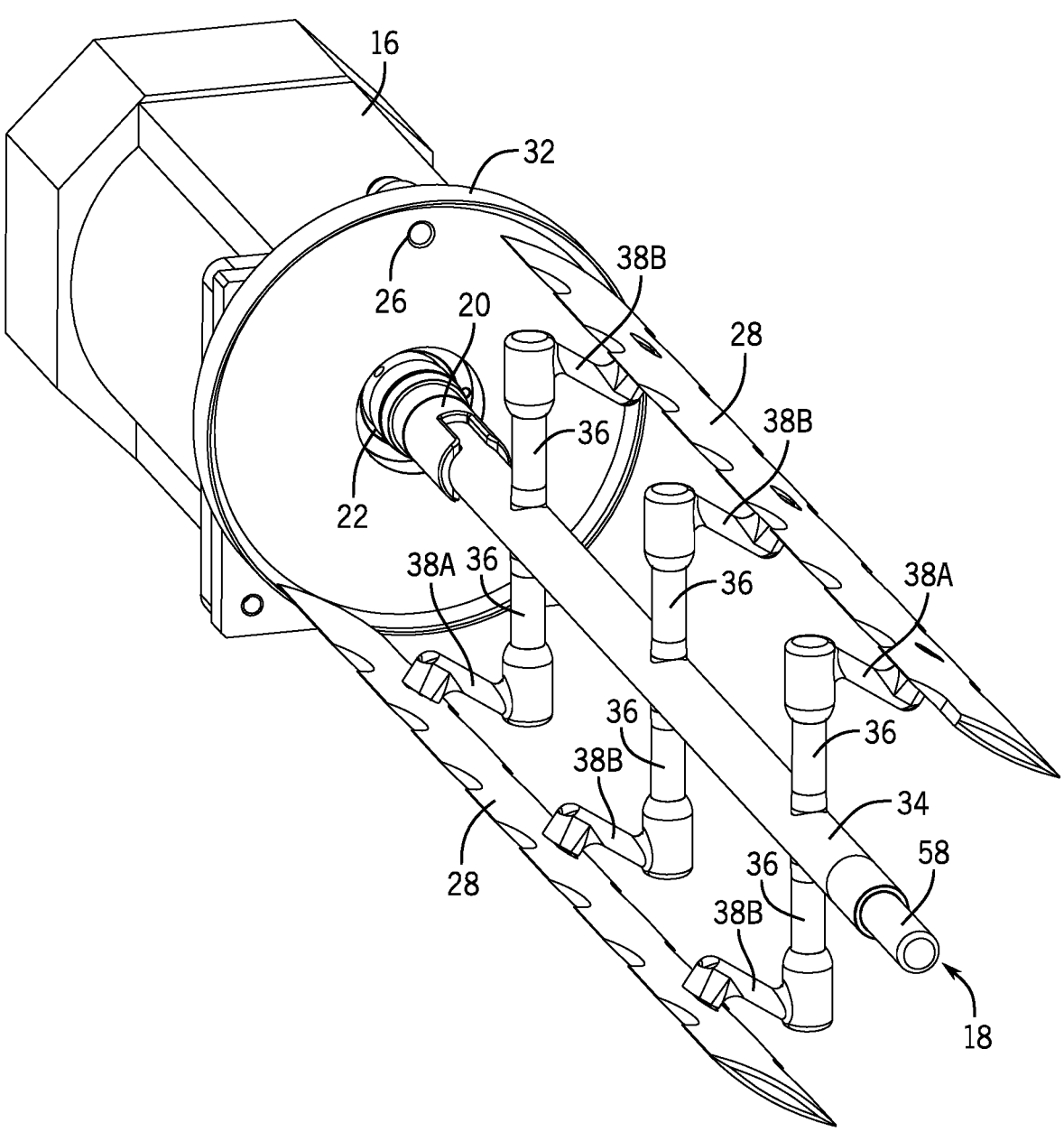
FIG. 3 is a perspective view of a beater bar.
Figure 4A:
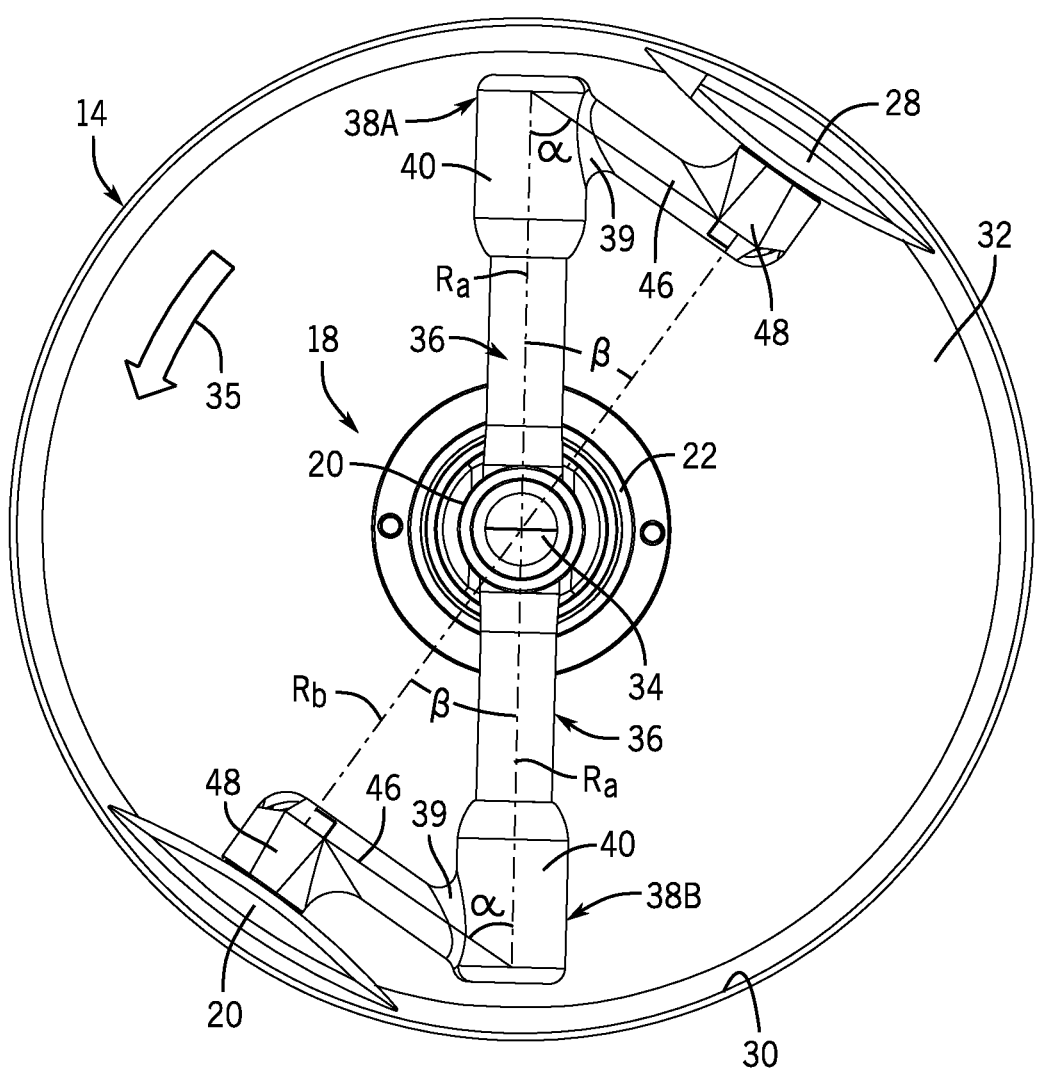
FIG. 4A is an end view of the beater bar.
Figure 4B:
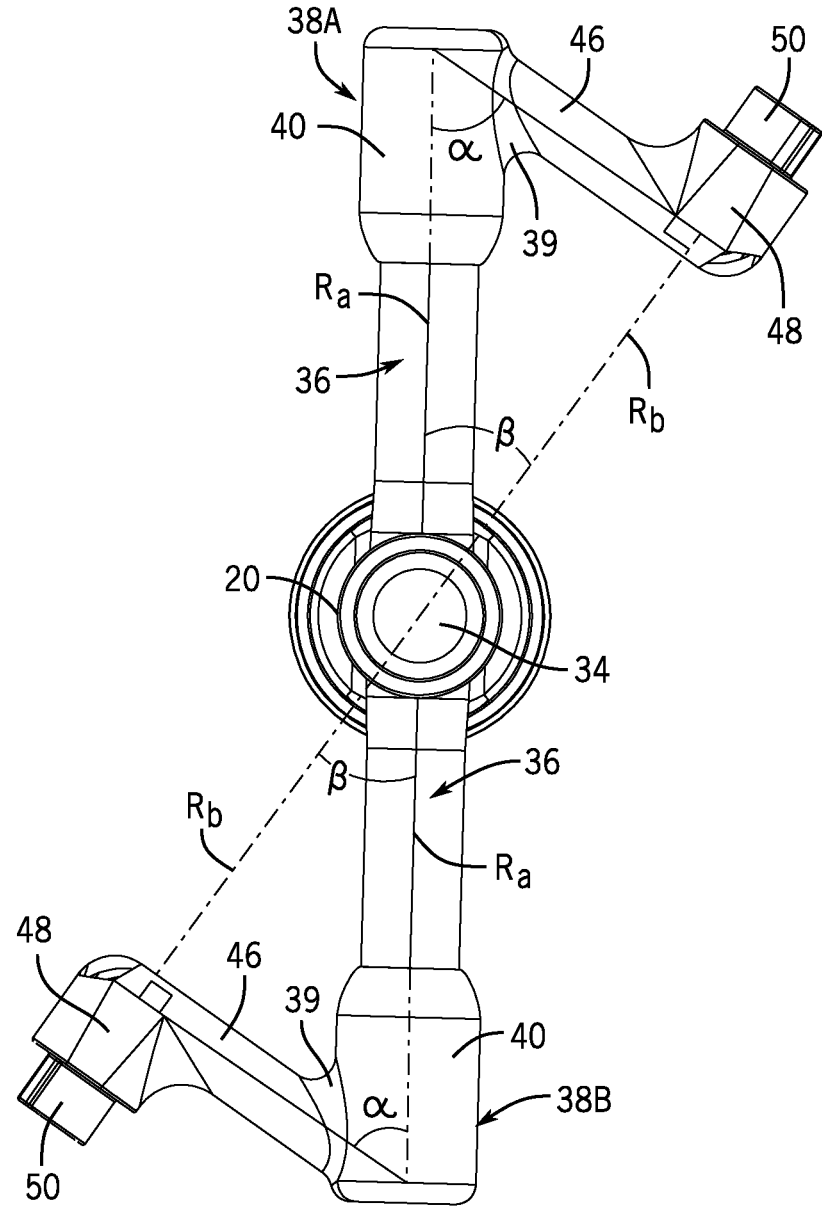
FIG. 4B is an isolated end view of the beater bar without the scraper blades.

FIG. 3 is a perspective view of a beater bar 18. FIG. 4A is an end view of the beater bar 18, while FIG. 4B is an end view of an isolated beater bar 18 without the scraper blades. An end wall 32 of the barrel 14 is depicted, while the rest of the interior surface 30 of the barrel 14 is shown in dashed lines. A motor 16 is coupled to the beater bar 18 by a coupling shaft 20 that passes through the rotary barrel seal 22 in the end wall 32. The coupling shaft 20 connects to the shaft 34 of the beater bar 18. The shaft 34 may be constructed of stainless steel or aluminum. Arms 36 extend radially outwards from the shaft 34. The arms 36 are also exemplarily constructed of metal. End caps 38 are connected to each of the arms 36 and the end caps 38 connect the scraper blades 28 to the arms 36. In alternative embodiments, the end caps 38 are formed integrally with the arms 36.

The motor 16 operates to rotate the beater bar 18 connected thereto exemplarily in the direction of arrow 35. In this direction of rotation, the arms 36 lead the rotation, while the end caps 38 extend behind the arms 36 relative to the direction of rotation. The scraper blades 28 lag the arms 36 in the direction of rotation indicated by arrow 35. In examples, it will be recognized that the motor 16 may be operated to rotate the beater bar 18 in the direction opposite that of arrow 35, for example for the purposes of maintenance, agitation, recirculation, or defrost operations.

The semi-frozen beverage has a viscosity generally greater than that of the same unfrozen beverage. Rigidity in the system of the shaft 34 and arms 36 moves the beater bar 18 through the semi-frozen beverage under the power of the motor 16. A shaft 34 and arms 36, which may be constructed of metal, provide this rigid system. However, as noted above, a rigid beater bar system has been found to transfer oscillations, impact forces, and positional shocks through the beater bar 18 to cause force and damage between the opposite scraper blade and the interior surface 30 of the barrel 14. The end caps 38 are exemplarily constructed of a polymer and/or plastic. The end caps 38 provide a resilient connection between the arms 36 and the scraper blade 28. As will be described in further detail herein, the end caps 38 create a connection of the scraper blade 28 to the shaft 34 at a radius which is offset from a radius along which the arms 36 extend. Forces imparted to or by the scraper blades 28 thus occur along radii different from the radii of the arms 36.

Figure 6:
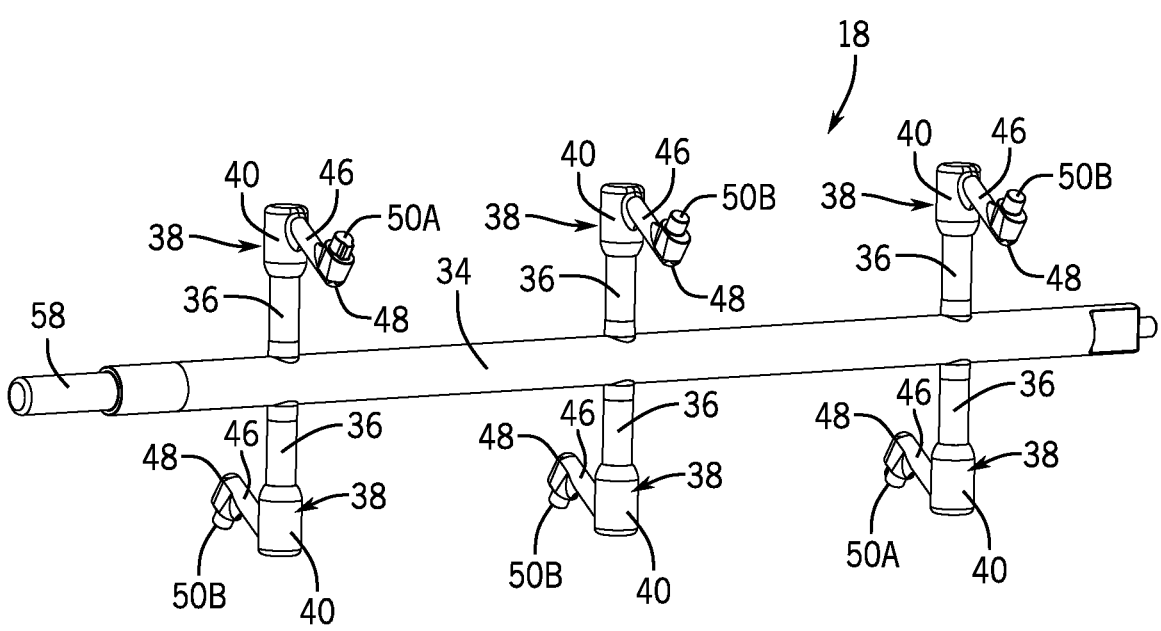
FIG. 6 is an isolated view of the beater bar shaft, arms, and end caps.
Figure 7:
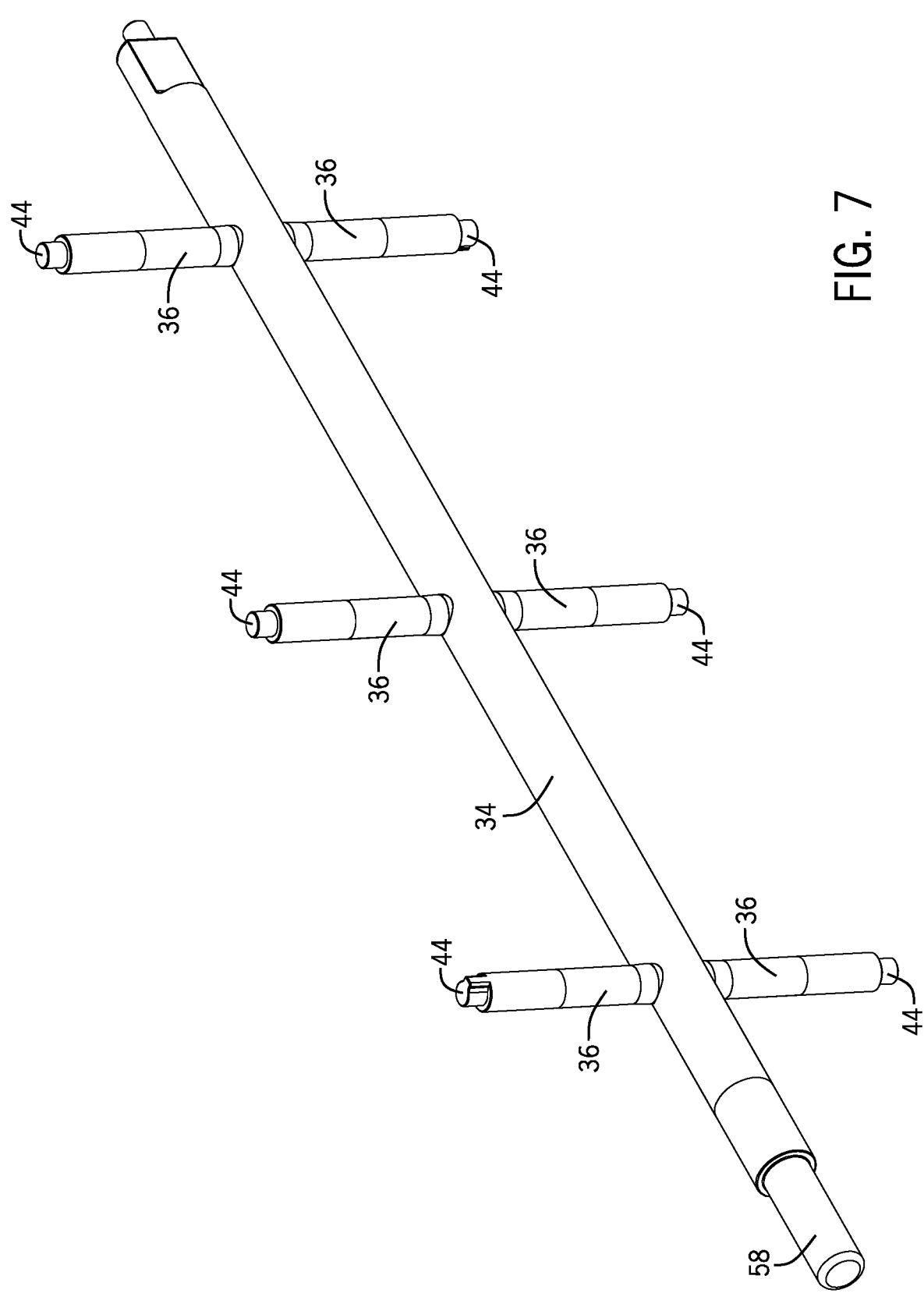
FIG. 7 is an isolated view of the beater bar shaft and arms.
Figure 8:
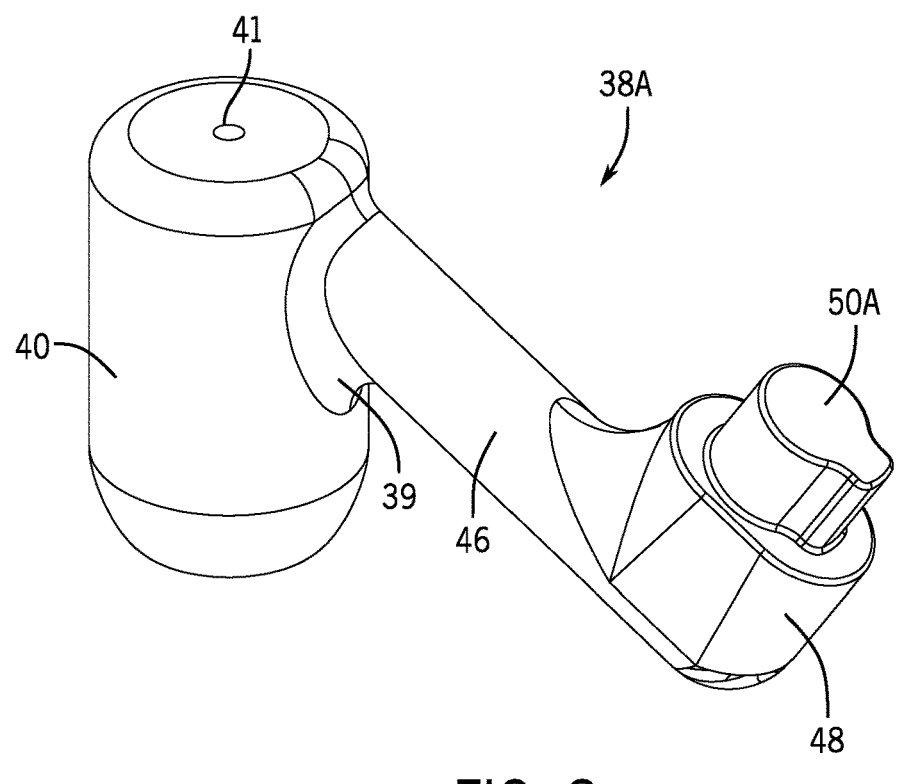
FIG. 8 is an isolated view of an end cap.
Figure 9:
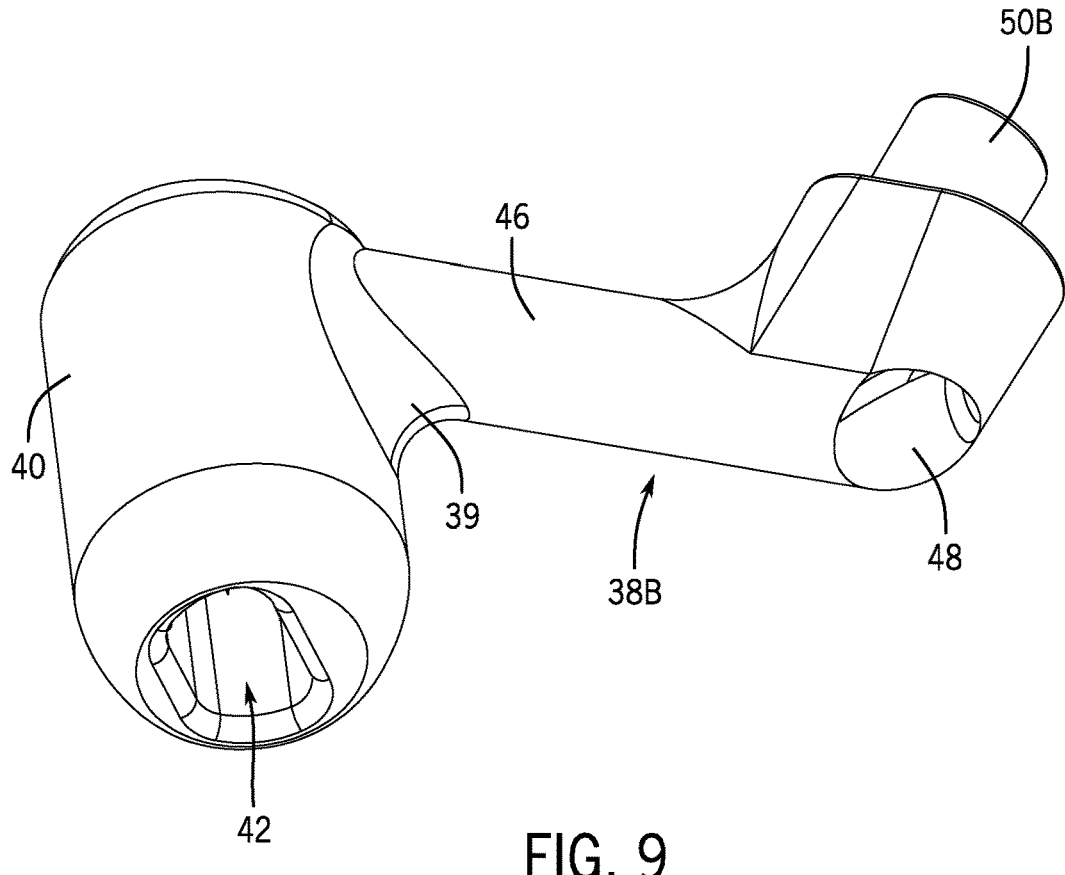
FIG. 9 is an isolated view of an end cap.

FIG. 6 is an isolated view of the beater bar 18 showing the shaft 34, arms 36 and end caps 38. FIG. 7 is an isolated view of the beater bar 18 showing the shaft 34 and the arms 36. FIGS. 8 and 9 are isolated views of the end caps 38. The end caps 38 are exemplarily constructed of a polymer and/or plastic. The end caps 38 have an arm cap 40 which includes a keyhole 42. The keyhole is configured to engage a keyed projection 44 on each of the arms 36. In alternative embodiments wherein the end caps 38 extend integrally from the arms 36, the arm cap 40 is formed with and extends from the same axis as the arms 36. The arm cap 40 further includes a hole 41 which allows trapped air pressure to escape upon installation of the end cap 38 to the arm 36, as well as allowing water interior of the arm cap to escape therefrom during freezing. The end caps 38 further include a beam 46 that exemplarily extends at an acute angle α relative to an associated arm 36 from the arm cap 40 to a scraper cap 48, forming an elbow 39 which is resilient, but deformable, as described herein. In examples, the beam 46 extends at a 45 degree angle relative to the arm cap 40 and arm 36. In other examples, the beam 46 extends at an angle between 65 degrees and 30 degrees. In still other examples, the beam 46 extends at an angle less than 45 degrees, while in other examples, the beam 46 extends at an angle less than 90 degrees. The scraper cap 48 includes a projection 50 that extends therefrom and is configured to engage a scraper blade 28. The scraper cap 48 and the projection 50 are exemplarily arranged at a right angle relative to the beam 46. This right angle between the scraper cap 48 and the beam 46 aligns the scraper cap 48 and the scraper blade 28 along a radius relative to the shaft 34 that offset from the radius of the arm 36 and the arm cap 40 by an angle β, wherein, in an example, angle α and angle β are complementary. It will be recognized that in other examples, the angle between the scraper cap 48 and the beam 46 may be an angle different from 90 degrees to an angle either greater or less than 90 degrees, the resulting angle α and angle β would be adjusted accordingly.

The beam 46 of the end cap 38 forms a cantilever relative to the arm 36. As previously noted, the end cap 38 is exemplarily constructed of a polymer and/or plastic. In examples, the end cap 38 is constructed of a material with a more flexible elastic modulus compared to that of the arms and/or shaft of the beater bar 18. The flexibility of the beam 46 is further defined by the thickness of the beam 46 roughly in the direction of the radius from the shaft 34, or relatedly, in the direction of the scraper cap 48 relative to the beam 46. That is, a thicker beam 46 in the direction of force transferred from the scraper blade 28 to the scraper cap 48 to the beam 46 will result in a stiffer beam.

As noted above, during operation of the beverage dispensing machine 10, force in the radially outward direction from the semi-frozen beverage within the barrel and the rotation of the beater bar 18, generally forces the scraper blades 28 into contact with the interior surface 30 of the barrel 14. The arms 36, end caps 38, and scraper blades 28 are further dimensioned to place the scraper blades 28 into contact with the interior surface 30 of the barrel 14. The scraper blades 28, running along the interior surface 30, scrape newly-frozen beverage from the interior surface 30 and direct it to the interior of the barrel about the shaft 20 of the beater bar 18. However, impact forces from the scraper blade hitting irregularities on the interior surface, hitting particular accumulations of frozen beverage or ice crystals, and operational oscillations, if transferred through the beater bar, can cause impacts and forces from the opposite scraper blades 28 against the interior surface of the barrel, potentially damaging the barrel and/or the beater bar. The end caps 38, with the cantilevered beams 46 and scraper caps 48 oriented along a radius different from a radius of an associated arm 36, act as dampers both to the incursion of these forces on one side of the beater bar, but also a dampen to the transmission of these forces on the opposite side of the beater bar.

Referring primarily to FIG. 4a, the arms 36 extend along radius R_a and the radially opposed scraper caps 48 extend along radius R_b, shown in dashed lines. Radius R_a and radius $R_b$ are offset by the angle $\beta$, which can be determined using the angle $\alpha$ of the beam 46 with respect to the arms 36 and the length of the beam 46.

In prior art configurations, impact forces from the scraper blades hitting irregularities on the interior surface would be transferred along $R_a$ to the beater bar and the opposite scraper blade. In the present configuration, insofar as the end caps 38 are coupled to or formed integrally with the arms 36, impact forces will still be transferred from the scraper blades 28 to the arms 36. However, by orienting the scraper blades 28 and scraper caps 48 along the radius $R_b$ via the end caps 38, the impact forces which are experienced by the beater bar 18 along the radius $R_a$ are a fraction of those experienced in prior art configurations. The relationship between the forces is approximately $F_a = F_b*(\cos \beta)$, such that a force $F_a$ experienced along $R_a$ is equivalent to a force $F_b$ experienced along radius $R_b$ multiplied by $\cos \beta$. Insofar as the angle $\beta$ is less than 90 degrees, the value of $\cos \beta$ is less than 1 and greater than 0, such that the force $F_a$ is less than the force $F_b$ experienced by the scraper blade 28 and the scraper cap 48. The more acute the angle $\alpha$ between the arm 36/arm cap 49 and the beam 46, the greater the angle $\beta$, and thus, the more the impact force is diminished as it is transferred from the scraper blade radius $R_b$ to the arm radius $R_a$.

By diminishing the force on one side of the beater bar 18, the end cap 38 also dampers the transmission of these forces onto the opposite side of the beater bar 18. The force $F_t$ which is transferred to the opposite scraper blade 28 is approximately $F_t = F_b*(\cos \beta)^2$, such that the force $F_t$ experienced along radius $R_b$ of the opposite scraper blade 28 and scraper cap 48 is diminished from by a factor of $(\cos \beta)^2$.

Furthermore, insofar as the system is not perfectly elastic, the end caps 38, being formed of a flexible elastic modulus, deform radially inward, the beam 46 pivoting at the elbow 39 when experiencing the impact force, thus converting the kinetic energy into thermal energy and absorbing a portion of the force that would have otherwise been transferred to the beater bar 18.

Figure 5:
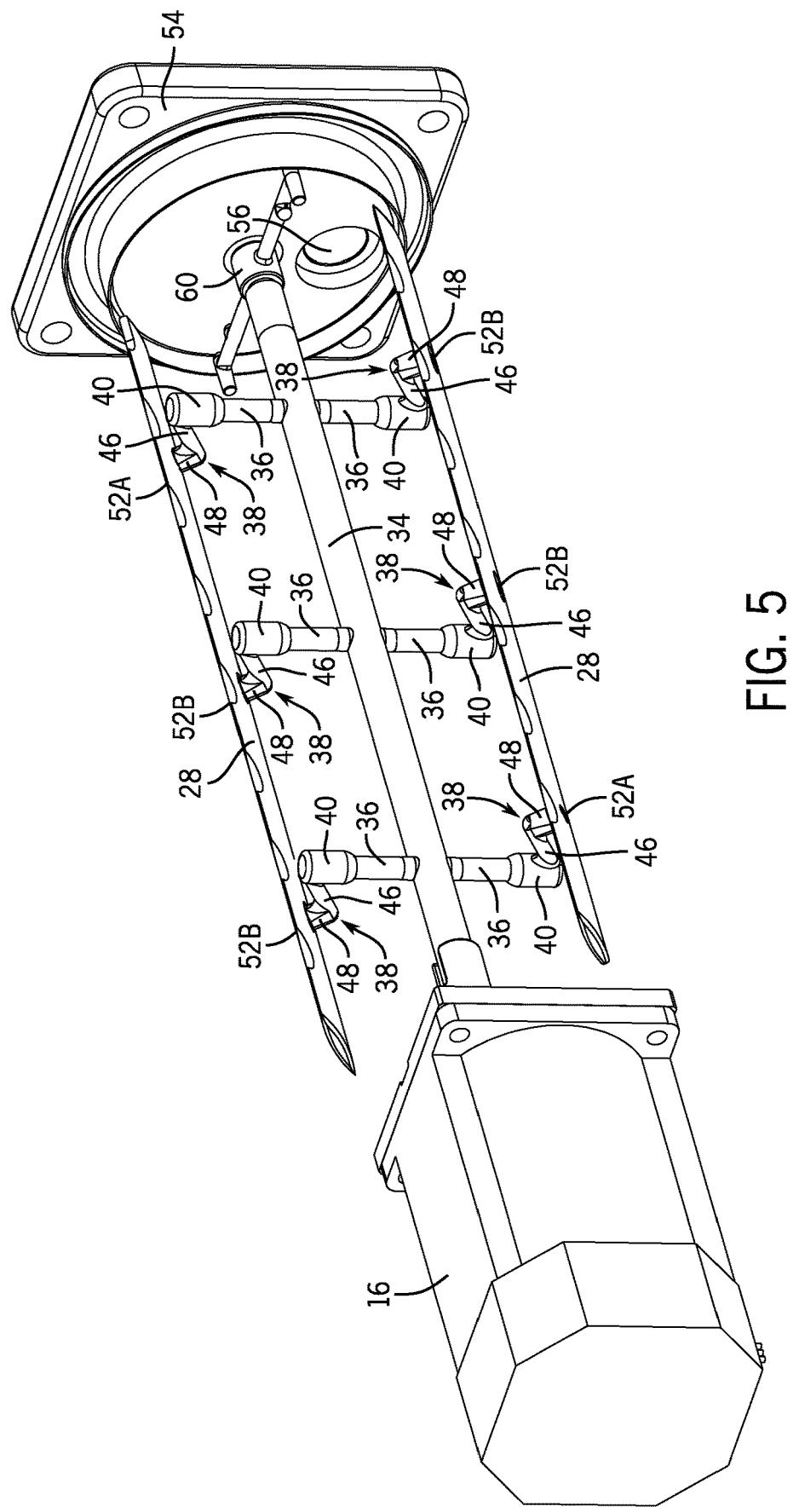
FIG. 5 a perspective view of the beater bar extending between the motor and the face plate.
Figure 10:
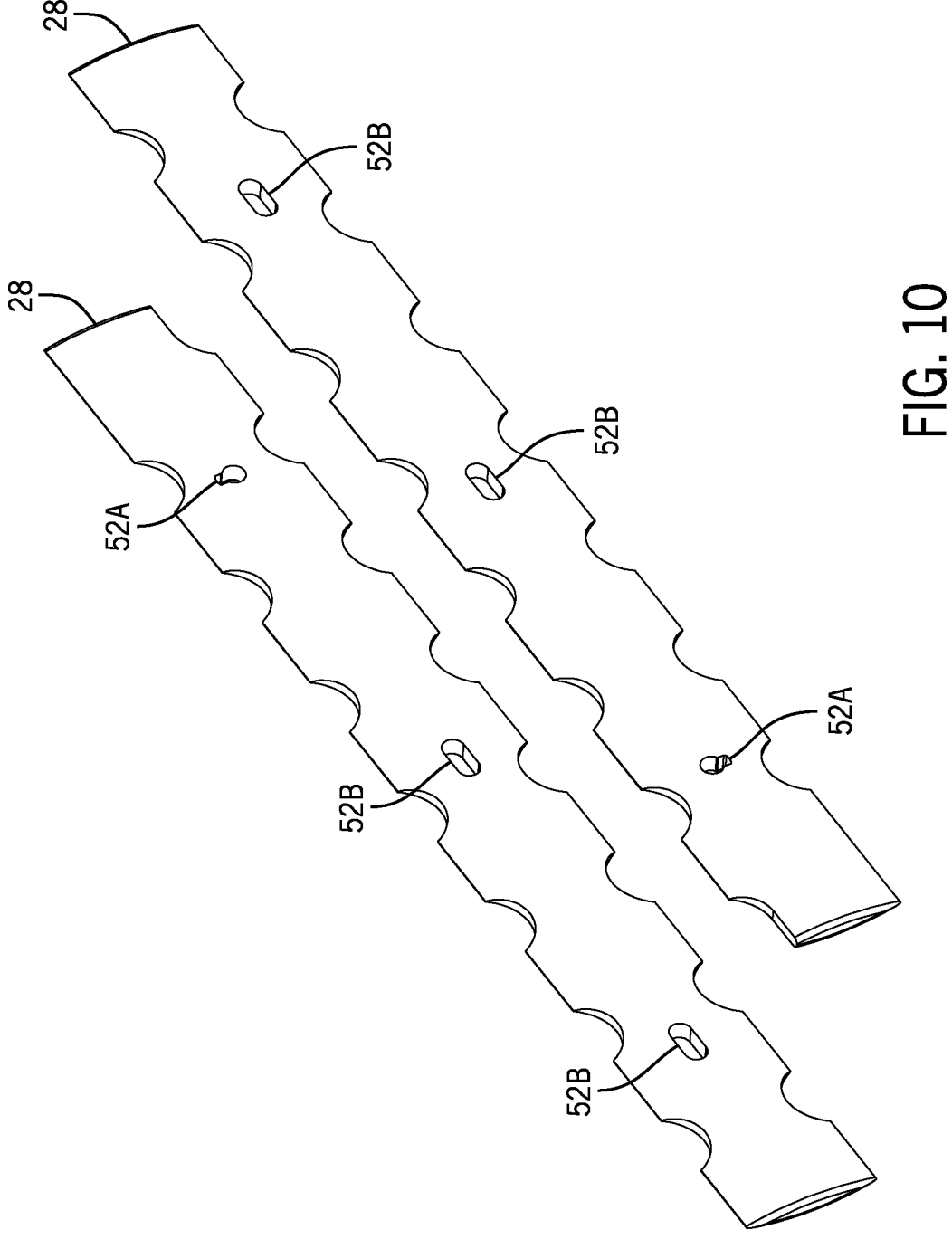
FIG. 10 is an isolated view of the scraper blades.

With reference to FIGS. 8 and 9, it will be recognized that there may be two configurations of end caps 38. FIG. 8 depicts an example of an end cap 38A a keyed projection 50A. FIG. 9 depicts an example of an end cap 38B having an unkeyed projection 50B. Similarly, the keyhole 42 in the arm caps 40 and projections 44 of the arms 36 are exemplarily keyed in opposite directions to delineate the respective positions on the beater bar 18 to which the keyed end caps 38A and the unkeyed end caps 38B are to be secured. Referring to FIGS. 3, 5, and 10, the scraper blades 28 are configured to secure to three end caps 38 secured to parallel arms 36 extending radially from the shaft 34. The scraper blade 28 includes one keyed slot 52A and two unkeyed slots 52B. This enables the same design and part for the scraper blade 28 to be used in two different orientations, on the opposing sides of the beater bar 18, and further helps to confirm to a servicing provider that the scraper blades 28 have been correctly installed on the beater bar 18.

FIG. 5 presents a perspective view of the beater bar 18 extending between the motor 16 and the face plate 54. The barrel is not depicted for clarity purposes. An outlet 56 through the face plate 54 is connected to a valve 12 (see FIG. 1) and upon opening of such a valve, the semi-frozen beverage flows out of the barrel through the outlet 56. The shaft 34 includes a tapered pin 58 that is received within a bushing 60 of the face plate, such engagement promotes the rotation of the beater bar 18 as driven by the motor 16.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives, and modifications are possible within the scope of the appended claims.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A beater bar configured for use within a beverage machine, the beater bar comprising:

a shaft;

a plurality of arms extending radially away from the shaft;

a plurality of end caps, with an end cap of the plurality of end caps extending away from each arm of the plurality of arms; and a scraper blade secured to the plurality of arms by engagement with the plurality of end caps respectively secured to the plurality of arms;

wherein each end cap comprises an arm cap configured to connect to an arm of the plurality of arms;

wherein each end cap further comprises a beam that extends away from the arm cap and connects the arm cap to a scraper cap configured to secure to the scraper blade;

wherein for each end cap the beam joins the arm cap at an elbow and the scraper cap is configured to deflect towards an arm of the plurality of arms about the elbow.

2. The beater bar of claim 1, wherein each arm of the plurality of arms comprises a keyed projection and wherein the arm cap comprises a keyhole that is configured to receive the keyed projection of an arm of the plurality of arms.

3. The beater bar of claim 1, wherein the shaft and the arms are constructed of metal and the end caps are constructed of a polymer.

4. A beater bar configured for use within a beverage machine, the beater bar comprising:

a shaft;

a plurality of arms extending radially away from the shaft;

a plurality of end caps, with an end cap of the plurality of end caps extending away from each arm of the plurality of arms; and a scraper blade secured to the plurality of arms by engagement with the plurality of end caps respectively secured to the plurality of arms;

wherein each end cap comprises an arm cap configured to connect to an arm of the plurality of arms;

wherein each end cap further comprises a beam that extends away from the arm cap and connects the arm cap to a scraper cap configured to secure to the scraper blade;

wherein each end cap is cantilevered from the arm to which the end cap is connected.

5. The beater bar of claim 4, wherein the arm cap and the arm are co-axial and the beam extends at an acute angle relative to the arm cap and the arm.

6. The beater bar of claim 5, wherein each of the scraper caps comprises a projection configured to engage the scraper blade.

7. The beater bar of claim 6, wherein at least one projection of the scraper caps is keyed to define an orientation of the scraper blade relative to the plurality of arms.

8. The beater bar of claim 7, wherein the arm cap comprises a keyhole that is configured to receive a keyed projection of an arm of the plurality of arms, wherein the keyhole of the arm cap corresponds to the orientation of the scraper blade defined by the projection of the scraper cap.

9. A beater bar configured for use within a beverage machine, the beater bar comprising:

a shaft;

a first plurality of arms extending radially away from the shaft;

a first plurality of end caps, with an end cap of the first plurality of end caps extending away from each arm of the first plurality of arms; and a first scraper blade secured to the first plurality of arms by engagement with the first plurality of end caps respectively secured to the first plurality of arms;

a second plurality of arms extending radially away from the shaft in a direction opposite the first plurality of arms; and a second scraper blade, wherein the second scraper blade is secured to the second plurality of arms by second end caps secured between each arm of the second plurality of arms and the second scraper blade;

wherein each end cap of the first plurality of end caps and the second plurality of end caps comprises:

an arm cap configured to connect the end cap to an arm of the plurality of arms;

a scraper cap configured to connect the end cap respectively to the first scraper blade or the second scraper blade; and a beam extending at an acute angle from the arm cap to the scraper cap.

10. The beater bar of claim 9, wherein scraper caps connected to the first scraper blade are radially opposite from scraper caps connected to the second scraper blade.

11. A beverage dispensing system comprising:

a barrel configured to be cooled;

a beater bar comprising:

a shaft;

a plurality of arms extending radially away from the shaft;

a plurality of end caps, with an end cap of the plurality of end caps extending away from each arm of the plurality of arms, each end cap of the plurality of end caps comprising a first arm cap configured to connect the end cap to an arm of the plurality of arms, a first scraper cap configured to connect the end cap to the scraper blade, and a first beam extending at an acute angle from the first arm cap to the first scraper cap; and a scraper blade secured to the plurality of arms by engagement with the end caps secured to each arm of the plurality of arms; and a motor coupled to the beater bar and configured to rotate the beater bar within the barrel.

12. The beverage dispensing system of claim 11, wherein each arm of the plurality of arms comprises a keyed projection and wherein each first arm cap comprises a keyhole that is configured to receive the keyed projection of an arm of the plurality of arms.

13. The beverage dispensing system of claim 11, wherein the plurality of arms is a first plurality of arms and the scraper blade is a first scraper blade and the plurality of end caps are first end caps, the beater bar further comprising:

a second plurality of arms extending radially away from the shaft in a direction opposite the first plurality of arms; and a second scraper blade, wherein the second scraper blade is secured to the second plurality of arms by second end caps secured between each arm of the second plurality of arms and the second scraper blade.

14. The beverage dispensing system claim 13, wherein each second end cap comprises:

a second arm cap configured to connect the second end cap to an arm of the second plurality of arms;

a second scraper cap configured to connect the second end cap to the second scraper blade; and a second beam extending at an acute angle from the second arm cap to the second scraper cap.

15. The beverage dispensing system of claim 11, wherein the motor is configured to rotate the beater bar within the barrel in a first direction and when the beater bar rotates within the barrel in the first direction, the scraper blade trails the plurality of arms.

16. A beater bar configured for use within a beverage machine, the beater bar comprising:

a shaft;

a plurality of arms extending radially away from the shaft;

a plurality of end caps, with an end cap of the plurality of end caps extending away from each arm of the plurality of arms; and a scraper blade secured to the plurality of arms by engagement with the plurality of end caps respectively secured to the plurality of arms;

wherein each end cap comprises an arm cap configured to connect to an arm of the plurality of arms;

wherein each arm of the plurality of arms comprises a keyed projection and wherein the arm cap comprises a keyhole that is configured to receive the keyed projection of an arm of the plurality of arms.

17. The beater bar of claim 16, wherein each end cap further comprises a beam that extends away from the arm cap and connects the arm cap to a scraper cap configured to secure to the scraper blade.

18. The beater bar of claim 16, wherein the shaft and the arms are constructed of metal and the end caps are constructed of a polymer.

19. A beater bar configured for use within a beverage machine, the beater bar comprising:

a shaft constructed of metal;

a plurality of arms extending radially away from the shaft, the arms constructed of metal;

a plurality of end caps, wherein the end caps are constructed of a polymer, and with an end cap of the plurality of end caps extending away from each arm of the plurality of arms; and a scraper blade secured to the plurality of arms by engagement with the plurality of end caps respectively secured to the plurality of arms.

20. The beater bar of claim 19, wherein each end cap of the plurality of end caps is cantilevered from the arm of the plurality of arms to which the end cap is connected.

\* \* \* \* \*